US 6,564,466 B2

(12) United States Patent
Uwai

(10) Patent No.: US 6,564,466 B2
(45) Date of Patent: May 20, 2003

(54) MEASURING APPARATUS FOR PULLEY

(75) Inventor: Chiaki Uwai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,603

(22) Filed: Sep. 26, 2001

(65) Prior Publication Data
US 2002/0040611 A1 Apr. 11, 2002

(30) Foreign Application Priority Data
Sep. 27, 2000 (JP) ........................................ 2000-294560

(51) Int. Cl.$^7$ ................................................. G01B 5/20
(52) U.S. Cl. ............................. 33/549; 33/551; 33/554; 33/555.1
(58) Field of Search .......................... 33/503, 549, 551, 33/553, 554, 555, 555.1

(56) References Cited

U.S. PATENT DOCUMENTS

| 4,324,049 A | * | 4/1982 | Blose ........................... 33/551 |
| 4,326,336 A | * | 4/1982 | Hreha .......................... 33/555 |
| 4,807,152 A | * | 2/1989 | Lane et al. .................... 33/503 |
| 4,903,413 A | * | 2/1990 | Bellwood .................... 33/551 |
| 4,916,824 A | * | 4/1990 | Shimazutzu et al. .......... 33/551 |
| 5,189,806 A | * | 3/1993 | McMurtry et al. ............ 33/553 |
| 5,461,797 A | | 10/1995 | Royer, et al. |
| 5,508,944 A | * | 4/1996 | Danielli ........................ 33/551 |
| 5,924,944 A | | 7/1999 | Hashimoto |
| 5,926,781 A | * | 7/1999 | Scott ............................ 33/503 |
| 6,175,813 B1 | * | 1/2001 | Purchase et al. ........... 33/555.1 |

FOREIGN PATENT DOCUMENTS

| JP | 353012637 A | * | 2/1978 | ................. 33/555.1 |
| JP | 361051511 A | * | 3/1986 | ................. 33/555.1 |
| JP | 6-56708 | | 8/1994 | |

* cited by examiner

Primary Examiner—Diego Gutierrez
Assistant Examiner—Travis Reis
(74) Attorney, Agent, or Firm—Smith, Gambrell & Russell

(57) ABSTRACT

A measuring apparatus for a pulley which features a workpiece holding post, a slide table and a measuring post which are controlled and moved by a controlling board. A probe tip extends from a detecting head of the measuring post and, in operation, is brought into contact with the portion to be measured to carry out the copying measurement which involves one or more measurements directed at the groove diameter of the ball groove, angle of the intersection, a divided angle, over-ball diameter, between diameter, lead deviation, run-out, concentricity, tapered angle of the conical surface, straightness of the conical surface, and deviation of the conical surface.

9 Claims, 11 Drawing Sheets

A-A

B-B

TAPERED ANGLE

STRAIGHTNESS

LH GROOVE  RH GROOVE

CENTER OF WORKPIECE (x0, y0)

RADIAL DEVIATION

CIRCUMFERENTIAL DEVIATION

MEASURING APPARATUS FOR PULLEY

BACKGROUND OF THE INVENTION

The present invention relates to a measuring apparatus for pulley of a continuous variable transmission, and particularly relates to the measuring apparatus for the pulley that is capable of measuring configurations and positional accuracies of the pulley.

Generally, the pulley is a principal component of the continuous variable transmission. A movable pulley is fitted to a fixed pulley via a ball spline so as to rotate in opposite direction with respect to each other, and a pulley width between a conical surface of the fixed pulley and a conical surface of the movable pulley varies by the axial relative movement of the movable pulley.

In such a variable width pulley, it is required to evaluate the configuration/positional accuracies of a ball groove of a ball spline and a conical surface of the pulley in order to control the qualities. Therefore, conventionally the configurations are measured by providing detecting members that employ reference balls the number of which are the same as the grooves. Each of the reference balls has a specified diameter. The reference balls are pressed with a pressure via a spring into a groove portion on a workpiece, and then amounts of displacements are measured. That is, at this time, a circumferential displacement and a radial displacement are compared with a master. Alternatively, in the other conventional technology the configurations are measured with a copying/tracing measurement that utilizes a three-dimensional measuring apparatus.

In a Japanese Utility Model Laid-Open No. 56708/1994, disclosed is a technology for measuring an irregular relative movement (amount of angular displacement) between both of the workpieces when one of the workpieces is fixed and the other workpiece is rotated about the axis of the rotation by an actuator just as a male pulley and a female pulley are assembled.

However, with the measuring technology in which the detecting member using the reference ball of a specified diameter is pressurized into the groove, the configuration measurement of the ball groove, a tapered angle of the conical surface, and other geometric positional accuracy cannot be evaluated quantitatively. In addition to this, since the number of samplings is limited/reduced due to the fact that the number of the detecting member is limited, the repeatability is inappropriate. Further, the pressurizing force of the spring easily varies, thereby disadvantageously lowering a measuring accuracy and deteriorating a zero point setting accuracy at the time of master setting.

In the copying/tracing measurement by the three-dimensional measuring apparatus, the sampling point is rough (for example, 10 points/4 mm approx.), and thus it is difficult to measure with high accuracy because of variations in repeatability. Likewise, in the technology in which the irregular (backlash) movement of the pulley assembly in the assembled state is measured disclosed in the Japanese Utility Model Laid-Open No. 56708/1994, lack of information on the configuration or positional accuracy of the other parts other than the ball groove makes the accurate control difficult. In addition to this, in the case of assemblies having significant irregular movements, it may be necessary to follow up the cause by disassembling it again, which is troublesome and is not necessarily advantageous to the productivity and to the quality control.

SUMMARY OF THE INVENTION

An object of the present invention is to provide a measuring apparatus for continuous variable transmission pulleys that can measure a configuration and a positional accuracy of a continuous variable transmission pulley quantitatively and can contribute to an improvement of a quality of finished products and lowering costs.

In order to achieve the above described object, a measuring apparatus for a pulley having a ball groove for a ball spline and a conical surface for varying a pulley width of the pulley, the measuring apparatus according to a first aspect of the present invention comprising:

- a workpiece holding post for rotatably holding the pulley about an axis of the pulley;
- a slide table slidable in a radial direction of the measuring apparatus;
- a measuring post slidably mounted on the table in a tangent direction orthogonal to the radial direction of the measuring apparatus;
- a detecting head slidably mounted on the measuring post in an axial direction orthogonal to both of the radial and tangent directions of the measuring apparatus, the detecting head having a probe including a ball of a specified diameter formed at the tip thereof; and
- a processor for controlling movements of the slide table, the measuring post and the detecting head to allow the probe to be brought into contact with a portion of the pulley to-be-measured, and for measuring configurations and positional accuracy thereof based on displacement data detected by the detecting head.

In the measuring apparatus, it is preferable that the processor measures, at least one of:

(a) a groove diameter of the ball groove;

(b) an angle of intersection defined by intersecting a line connecting the center of an ideal circle and one of the two contact points and a line connecting the center of the ideal circle and the center of a measuring reference of the pulley when an ideal circle of a specified diameter is brought into contact with the ball groove at two contact points, (c) a divided angle defined by intersecting lines connecting the center of a measuring reference of the pulley and each of the centers of a plurality of ideal circles, wherein each of the ideal circles has a specified diameter and is brought into contact with the respective ball groove at two contact points, (d) a diameter of an outer circle of an ideal circle is, wherein the ideal circle has a specified diameter and is brought into contact with the respective ball groove at two contact points, (e) a deviation between the center of a measuring reference of the pulley and the center of an outer circle to which a plurality of ideal circles are inscribed, wherein each of the ideal circles has a specified diameter and is brought into contact with the respective ball groove at two contact points, (f) a diameter of an inner circle to which a plurality of ideal circles are circumscribed, wherein each of the ideal circles has a specified diameter and is brought into contact with the respective ball groove at two contact points, (g) a deviation between the center of a measuring reference of the pulley and the center of an inner circle to which a plurality of said ideal circle are circumscribed, wherein the ideal circle has a specified diameter and is brought into contact with the respective ball groove at two contact points, (h) circumferential and radial deviations in a lead of the ball groove, (i) a tapered angle of the conical surface;
(j) a deviation in a normal direction with respect to a specified angle line of the conical surface, and
(k) a dimensional deviation with respect to a measuring reference of the conical surface.

In the above-mentioned measuring apparatus, it is preferable that the processor controls the slide table and the measuring post simultaneously to move the probe in the radial and tangential directions in the state of being in contact with the ball groove to carry out a copying measurement at many points, carries out circular-approximation by processing data on displacement in the radial direction and data on displacement in the tangential direction detected by the detecting head during the copying measurement at many points, and obtains an approximated diameter of the circle obtained by the circular-approximation as the groove diameter of the ball groove.

Further, in the measuring apparatus, it is preferable that the processor determines a measuring reference circle to which the tip of the prove should move based on several sampling data obtained prior to a copying measurement at many points, and controls the slide table and the measuring post simultaneously.

In the above-mentioned measuring apparatus, it is also preferable that the processor processes displacement data obtained by a copying measurement at many points, obtains a position of the center of the ideal circle assuming that the center of the circle obtained by approximating the ball groove, the contacting point, and the center of the ideal circle are on the same line, and obtains the angle of the intersection based on the position of the center of the ideal circle.

Further, in the measuring apparatus, it is preferable that the processor measures the divided angle based on the respective center positions of the ball at the moment when the probe with a ball diameter corresponding to the ideal circle is brought into contact with a plurality of ball grooves.

Moreover, in the above-mentioned measuring apparatus, it is preferable that the processor obtains the diameter of the circle passing through the respective center positions of the ball when the probe with a ball diameter corresponding to the ideal circle is brought into contact with the plurality of ball grooves, and adds or subtracts the ball diameter of the probe to or from the obtained diameter of the circle to determine the diameter of the circle in which a plurality of ideal circles are inscribed or the diameter of the circle to which a plurality of ideal circles are circumscribed.

In addition, in the measuring apparatus, it is preferable that the processor determines a line containing the apex of the conical surface obtained by controlling the measuring post to move in the tangent direction with the probe kept in contact with the conical surface of the pulley as a measuring reference centerline, carries out a copying measurement at many points by controlling the slide table and the measuring post simultaneously while moving the probe along the measuring reference centerline, and obtains the tapered angle of the conical surface based on data on displacement in the radial direction and data on displacement in the axial direction detected by the detecting head during the copying measurement at many points.

Note that in the above-measuring apparatus, the line acting as the measuring reference centerline is directed to a line which contains the apex of the conical surface and extends perpendicular to the tangential direction.

In other words, according to the above-mentioned measuring apparatus, the tip of the probe of the detecting head mounted on the measuring post on the slide table is brought into contact with the portion-to-be-measured of the pulley held on the workpiece holding post, and the configuration and the positional accuracy of the portion-to-be-measured are measured by measuring the absolute space coordinate based on displacement data detected by the detecting head.

At least one of (a) the groove diameter of the ball groove on the pulley, (b) an angle of the intersection defined, when an ideal circle of a specified diameter is brought into contact with the ball groove at two points, by intersecting a line connecting the center of the ideal circle and the contact points and the line connecting the center of the ideal circle and the center of the measuring reference, (c) an angle divided by a group of lines connecting each of the centers of the plurality of the ideal circles and the center of the measuring reference, (d) a diameter of the outer circle to which a plurality of the ideal circles are inscribed, (e) a deviation between the center of the outer circle and the center of the measuring reference, (f) the diameter of the inner circle to which a plurality of the ideal circles are circumscribed, (g) the deviation between the center of the inner circle and the center of the measuring reference, (h) circumferential and radial deviations in the lead of the ball groove, (i) a tapered angle of the conical surface of the pulley, (j) the deviation in the normal direction with respect to the specified angle lines of the conical surface, and (k) a dimensional deviation with respect to the measuring reference of the conical surface is measured.

The slide table and the measuring post are controlled simultaneously to move the probe in the state of being in contact with the ball groove to carry out the copying measurement at many points in the direction of the radial axis, or in the direction of the movement of the slide table, and in the direction of the tangent axis, or the direction of the movement of the measuring post on the slide table. Then data on displacements in the direction of the radial axis and the data on the displacement in the direction of the tangent axis detected by the detecting head during the copying process at many points are processed and estimated by a circular approximation, and the diameter of approximated circle is obtained as a groove diameter of the ball groove.

The measuring reference circle on which the tip of the probe should move along is determined based on the sampling data obtained at several points prior to the copying measurement of the ball groove, and the slide table and the measuring post are controlled simultaneously to carry out the copying measurement along the measuring reference circle.

Displacement data at many points obtained by the copying measurement of the ball groove is processed to assume that the center position of the circle obtained by approximating the ball groove, the contacting point, and the center position of the ideal circle are on the same line, and the angle of intersection is obtained based on the center position.

The angle is measured based on the respective center positions of the ball at the moment when the probe with a ball diameter corresponding to the ideal circle is brought into contact with a plurality of the ball grooves.

The diameter of the circle passing through the respective center positions of the ball when the probe with the ball diameter corresponding to the ideal circle is brought into contact with the plurality of the ball grooves is obtained, and the ball diameter of the probe is added to or subtracted from the diameter of the circle to determine the diameter of the outer circle in which the plurality of the ideal circles are inscribed or the diameter of the inner circle to which the plurality of the ideal circles are circumscribed.

The apex of the conical surface obtained by controlling the measuring post to move in the direction of the tangent axis with the probe kept in contact with the conical surface of the pulley is determined as the measuring reference centerline, and the copying measurement at the many points is carried out by controlling the slide table and the measuring post simultaneously while moving the prove along the measuring reference centerline in the direction of the radial axis. Then the tapered angle of the conical surface is obtained based on the data on the displacements in the direction of the radial axis and the data on the displacement in the direction of the axial axis detected by the detecting head during the copying measurement at many point.

DETAILED DESCRIPTION OF THE PREFERRED EMBODIMENTS

Figure 1:
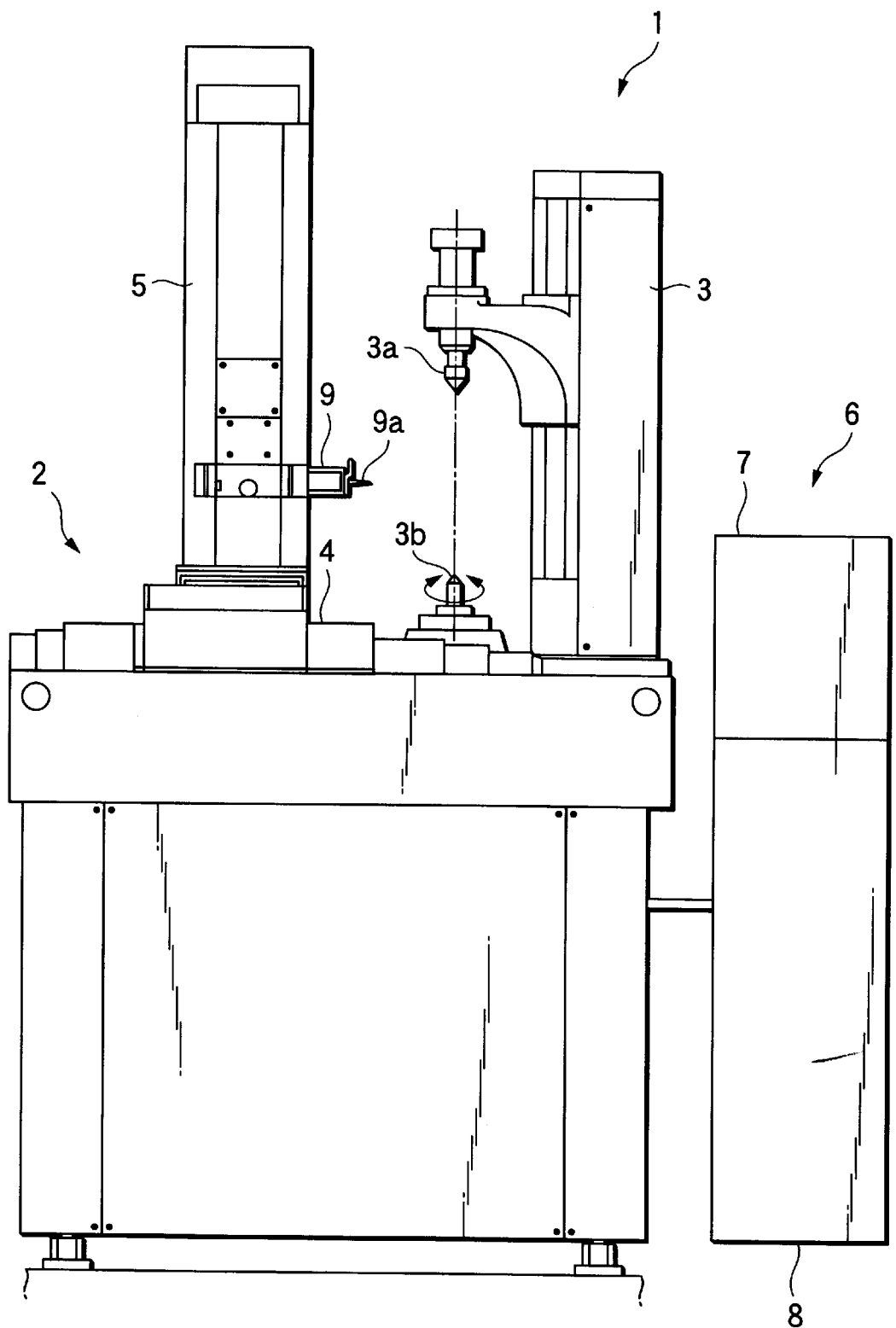
FIG. 1 is a block diagram of an entire measuring apparatus.
Figure 2:
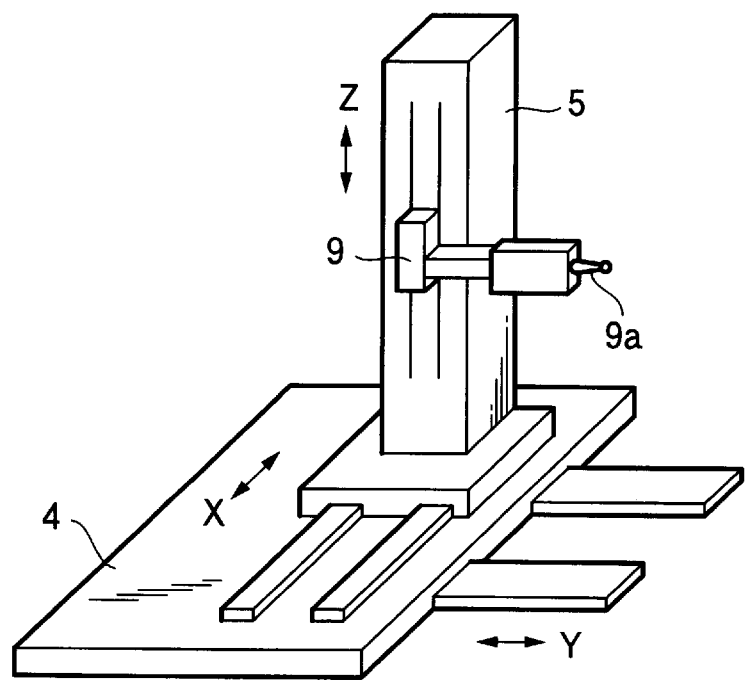
FIG. 2 is an explanatory drawing of a slide table.
Figure 3A:
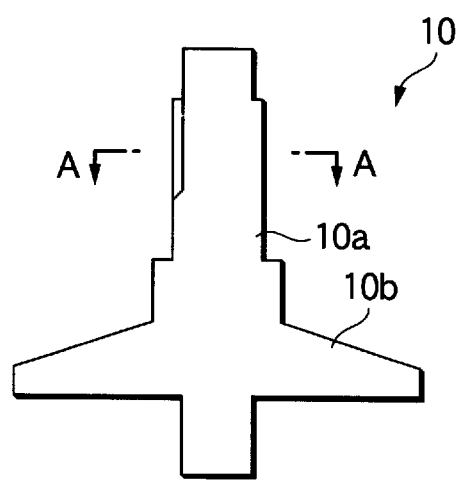
FIGS. 3A and 3B are explanatory drawings of a shaft pulley.
Figure 3B:
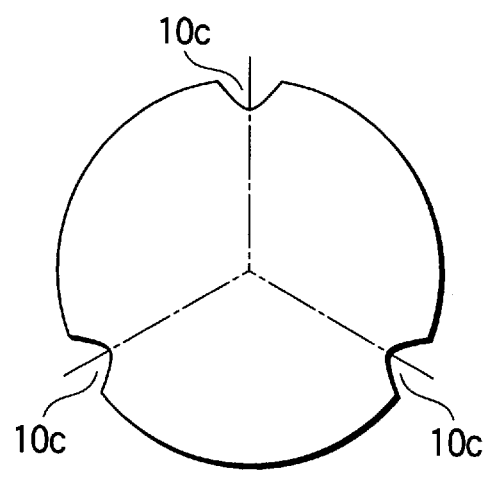
Figure 4A:
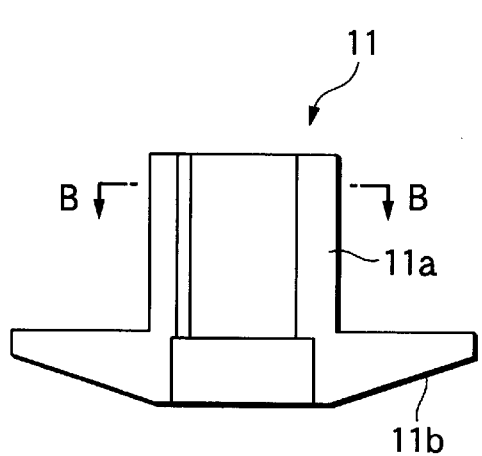
FIGS. 4A and 4B are the explanatory drawings of a sheave pulley.
Figure 4B:
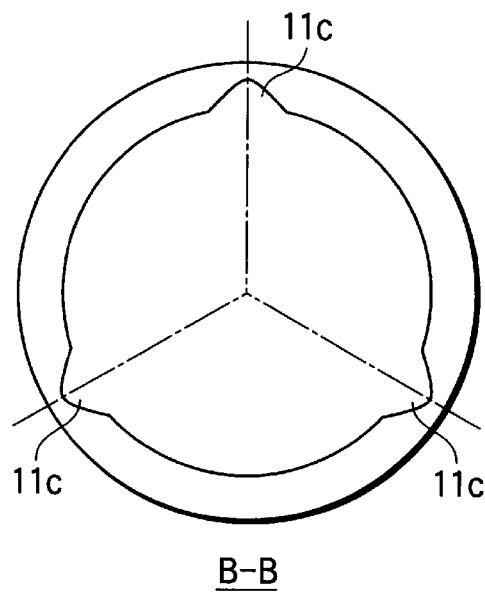
Figure 5:
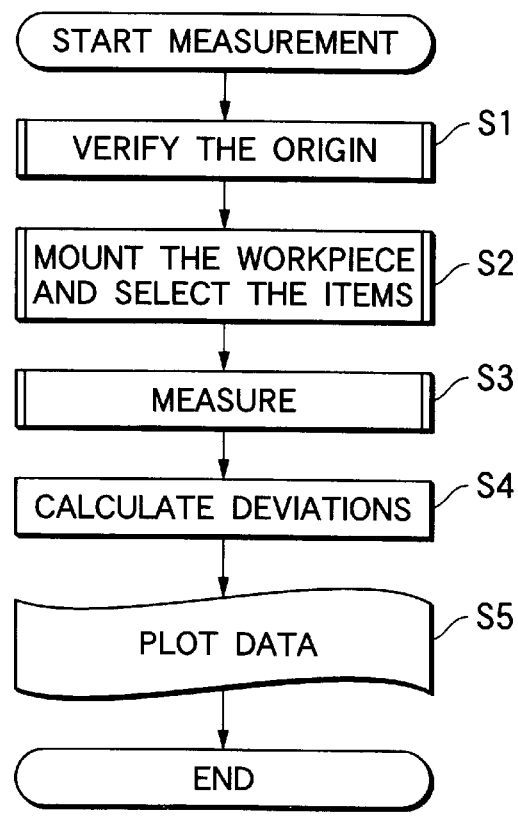
FIG. 5 is a flow chart of a basic measurement process.
Figure 6A:
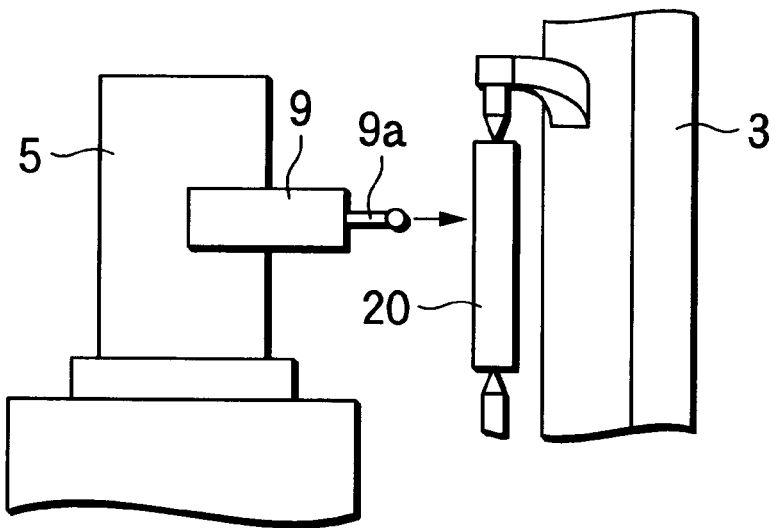
FIGS. 6A and 6B are the explanatory drawings showing verifications of an origin by a master.
Figure 6B:
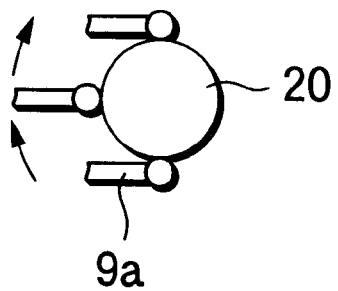
Figure 7:
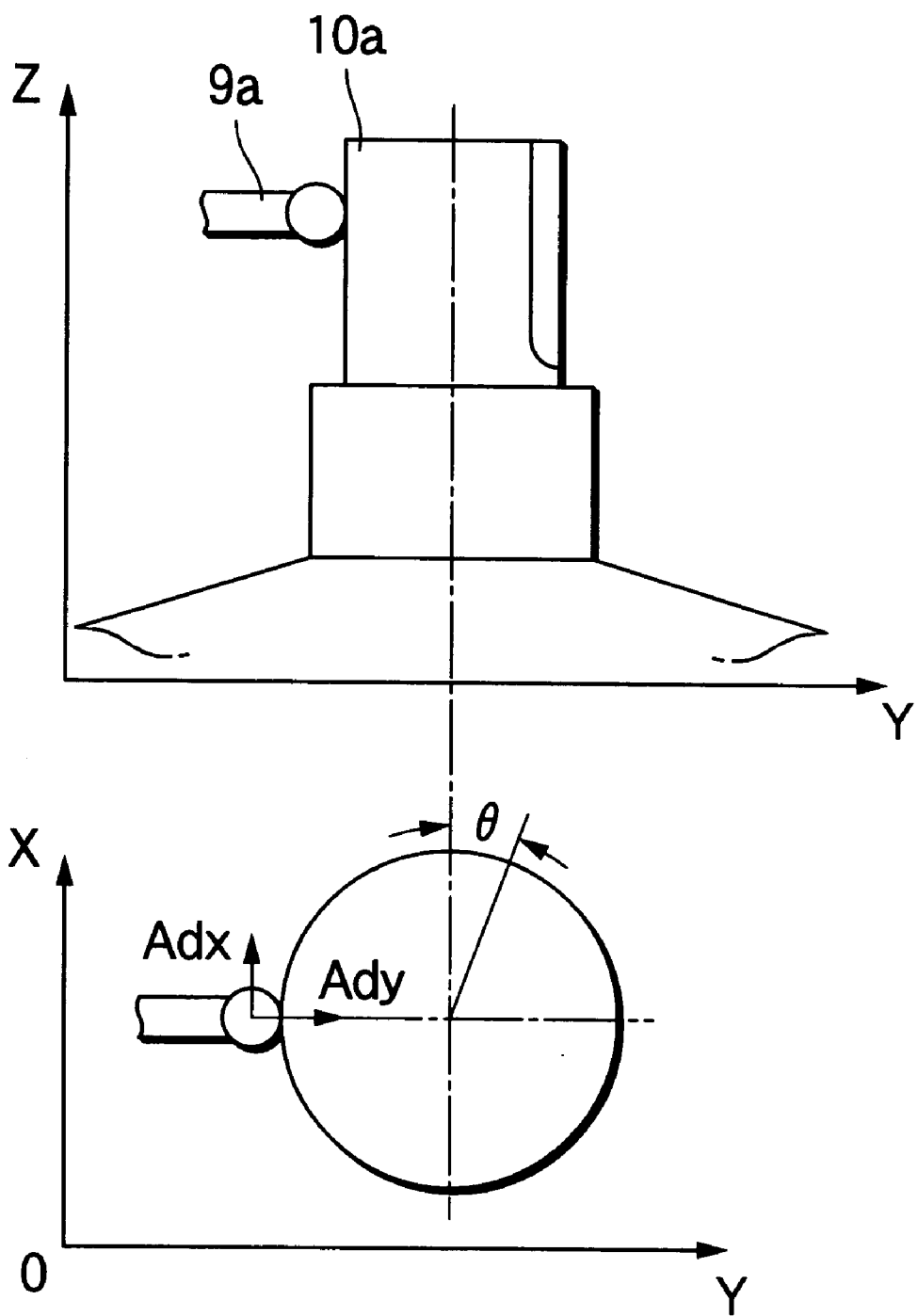
FIG. 7 is then explanatory drawing showing the measurement of a center of a workpiece.
Figure 8A:
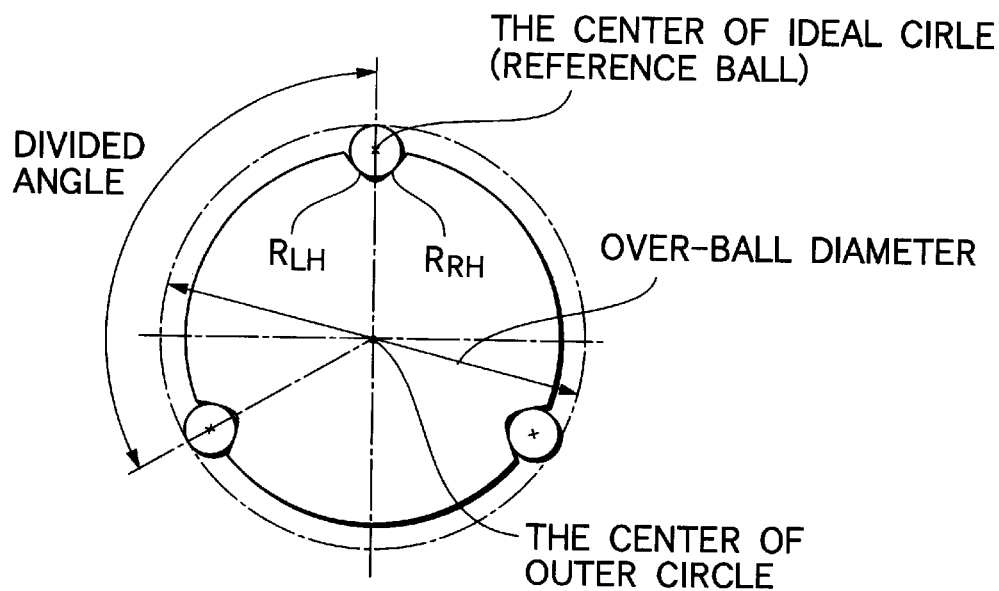
FIGS. 8A and 8B are the explanatory drawings showing points to be measured on the shaft pulley.
Figure 8B:
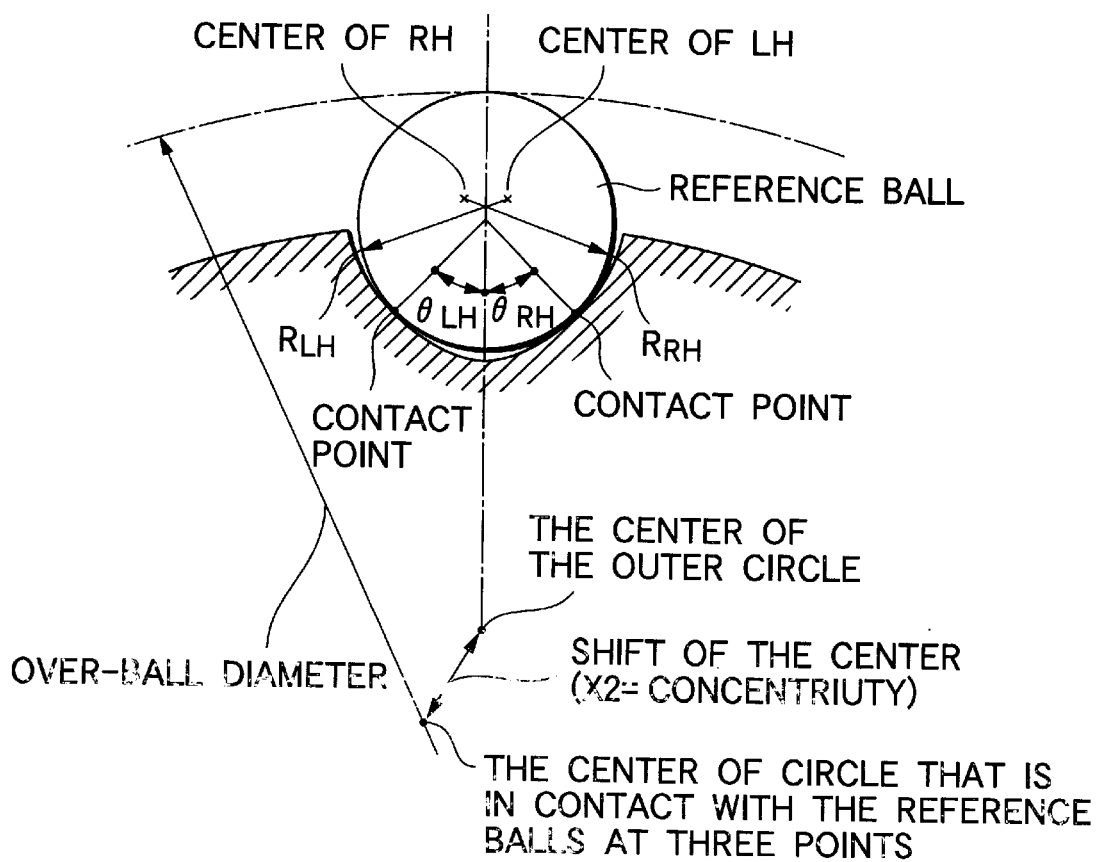
Figure 9A:
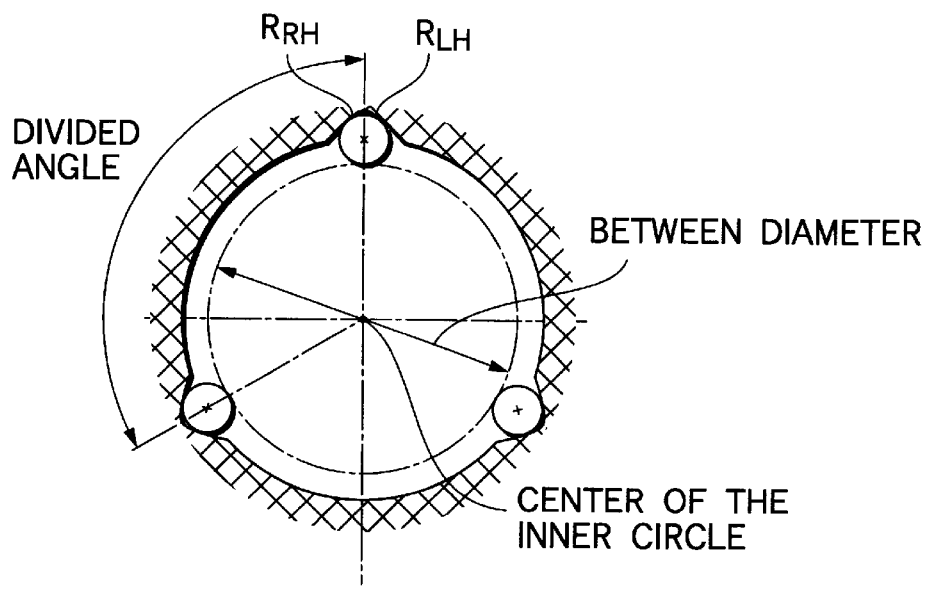
FIGS. 9A and 9B are the explanatory drawings showing the position of the sheave pulley to be measured.
Figure 9B:
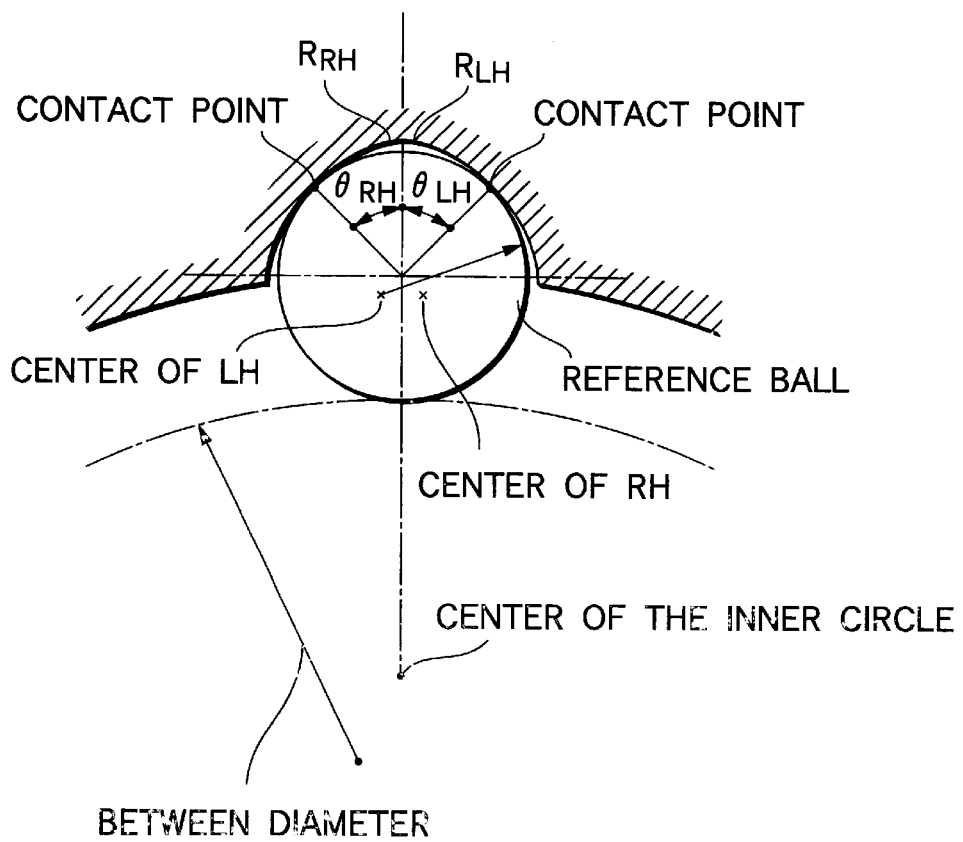
Figure 10:
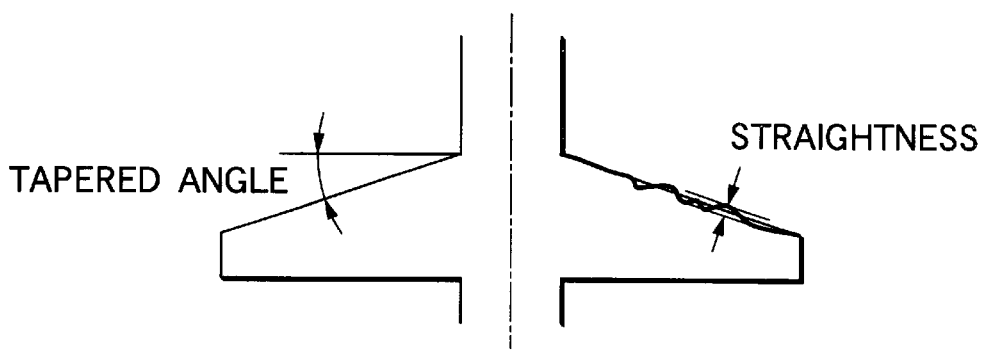
FIG. 10 is the explanatory drawing showing the position to be measured on a conical surface.
Figure 11:
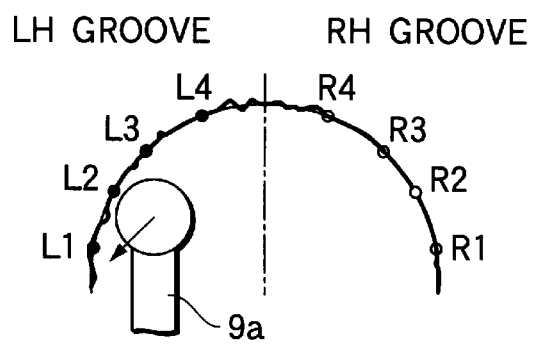
FIG. 11 is the explanatory drawing showing a reference line of a movement for measuring the ball groove.
Figure 12:
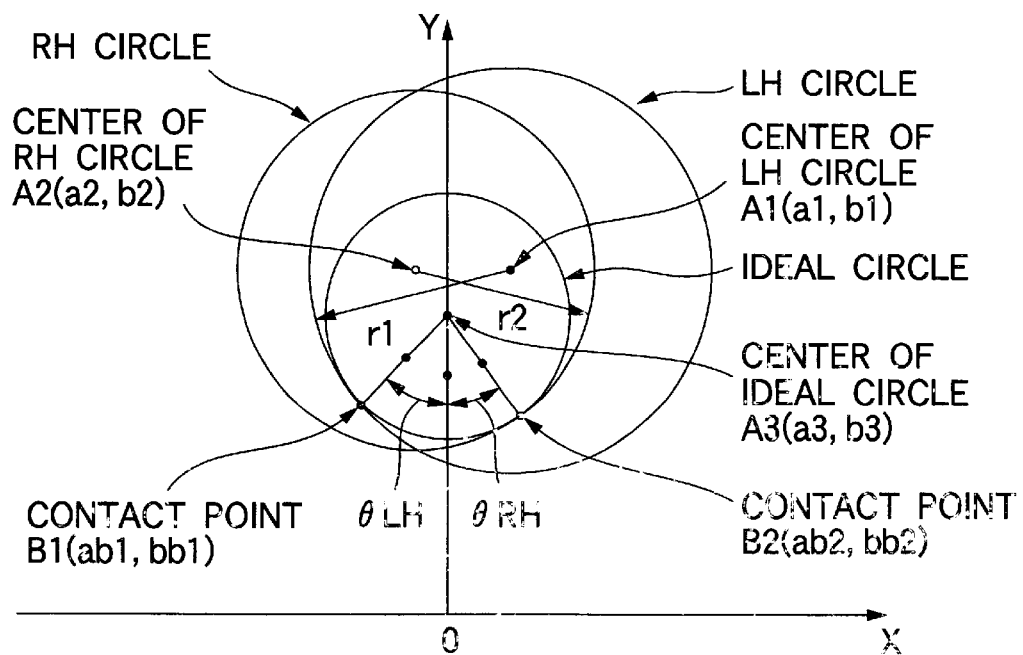
FIG. 12 is the explanatory drawing showing a relationship between the ball groove and an ideal circle.
Figure 13:
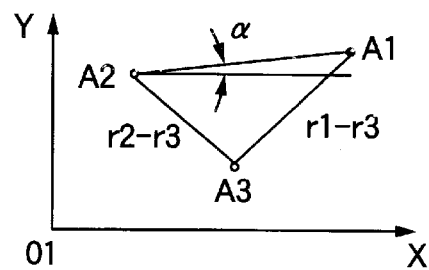
FIG. 13 is the explanatory drawing showing a central coordinate of the ideal circle.
Figure 14:
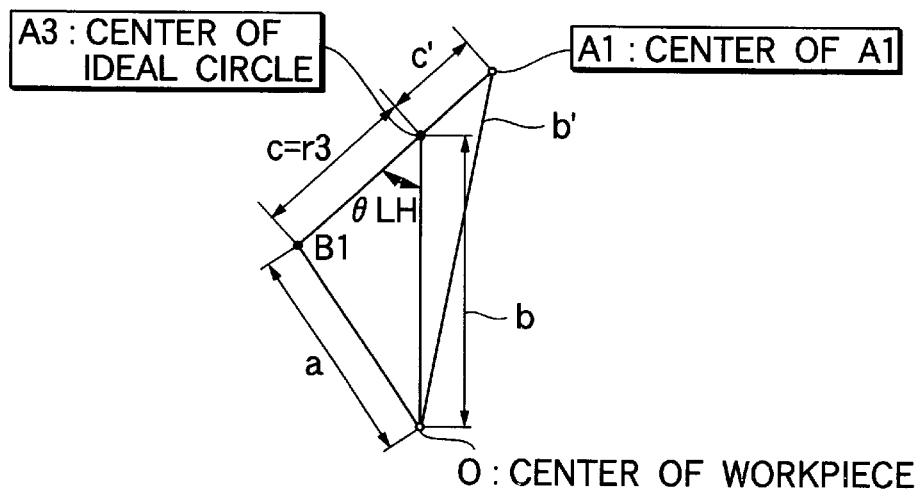
FIG. 14 is the explanatory drawing showing a trigonometry for obtaining a rolling angle.
Figure 15:
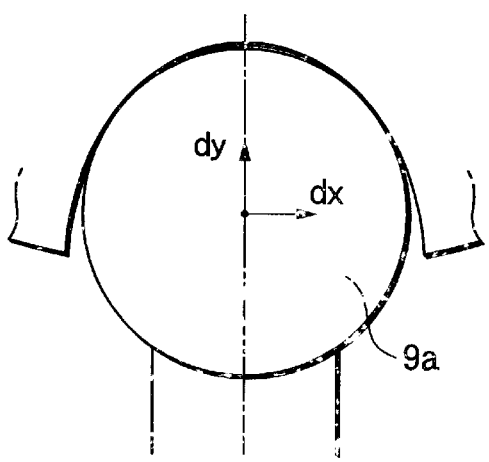
FIG. 15 is an explanatory drawing of a measurement of a divided angle.
Figure 16:
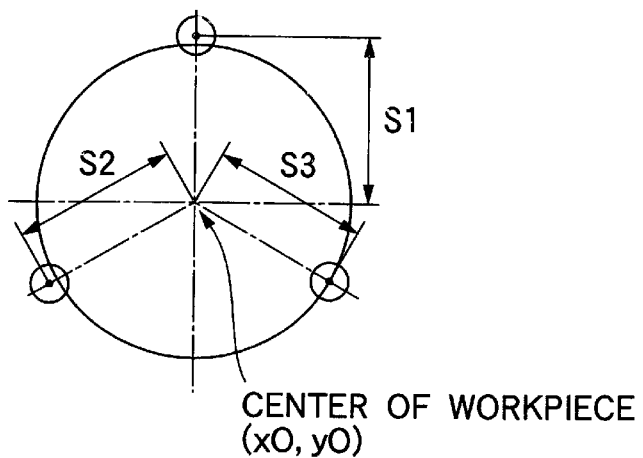
FIG. 16 is the explanatory drawing showing the measurement of a deflection.
Figure 17:
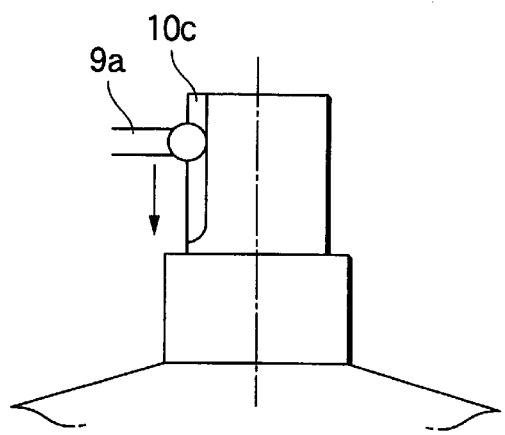
FIG. 17 is the explanatory drawing of the measurement of a lead.
Figure 18:
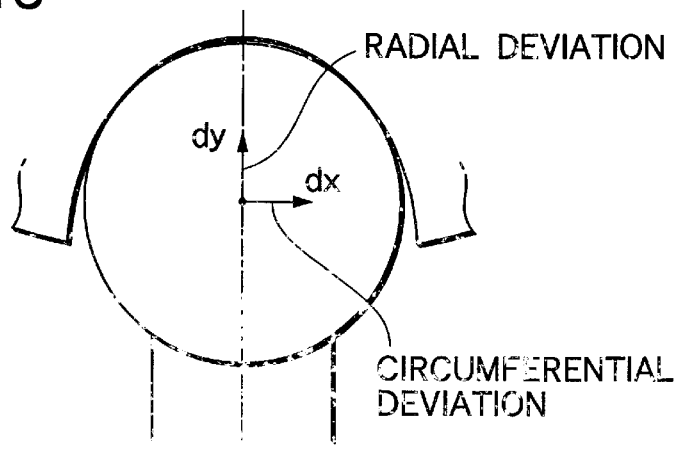
FIG. 18 is the explanatory drawing showing circumferential and radial deviations.
Figure 19A:
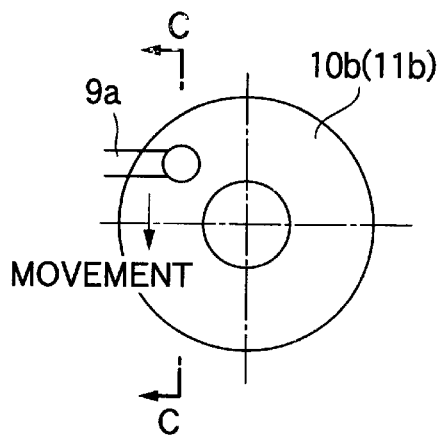
FIGS. 19A and 19B are the explanatory drawings of the measurement of the conical surface.
Figure 19B:
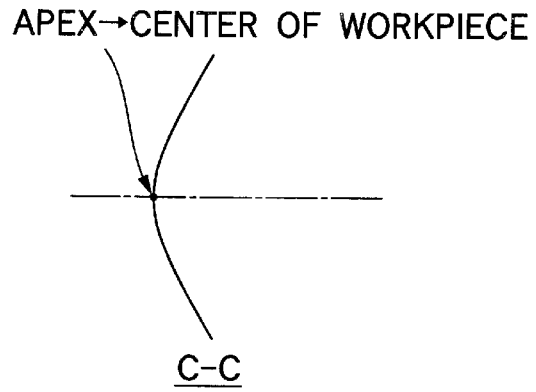
Figure 20:
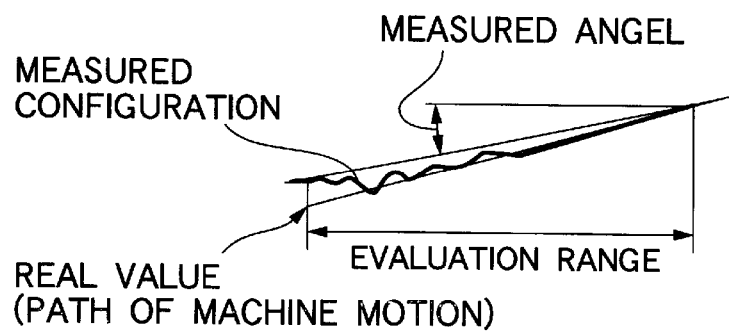
FIG. 20 is the explanatory drawing of the measurement of a tapered angle.
Figure 21:
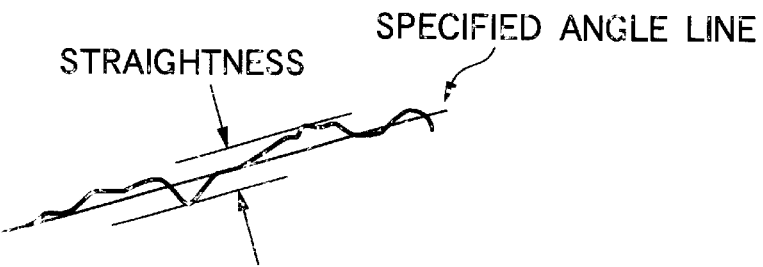
FIG. 21 is the explanatory drawing of a straightness of the conical surface.

Referring now to the drawings, the embodiments of the present invention will be described. FIG. 1 to FIG. 21 show an embodiment of the present invention. FIG. 1 is a block diagram of an entire measuring apparatus. FIG. 2 is an explanatory drawing of a slide table. FIGS. 3A and 3B are explanatory drawings of a shaft pulley. FIGS. 4A and 4B are explanatory drawings of a sheave pulley. FIG. 5 is a flow chart of a basic measurement process. FIGS. 6A and 6B are the explanatory drawings showing a verification of an origin by a master. FIG. 7 is the explanatory drawing showing the measurement of a center of a workpiece. FIGS. 8A and 8B are the explanatory drawings showing the points to be measured on the shaft pulley. FIGS. 9A and 9B are the explanatory drawings showing the points to be measured on the sheave pulley. FIG. 10 is an explanatory drawing showing the position to be measured on the conical surface. FIG. 11 is an explanatory drawing showing the reference line of the movement for measuring the ball groove. FIG. 12 is an explanatory drawing showing a relationship between the ball groove and an ideal circle. FIG. 13 is the explanatory drawing showing a central coordinate of the ideal circle. FIG. 14 is the explanatory drawing showing the trigonometry for obtaining a rolling angle. FIG. 15 is the explanatory drawing of the measurement of the divided angle. FIG. 16 is the explanatory drawing showing the measurement of a deflection. FIG. 17 is the explanatory drawing of the measurement of the lead. FIG. 18 is the explanatory drawing showing circumferential and radial deviations. FIGS. 19A and 19B are the explanatory drawings of the measurement of the conical surface. FIG. 20 is the explanatory drawing of the measurement of a tapered angle. Finally, FIG. 21 is the explanatory drawing of straightness of the conical surface.

As shown in FIG. 1, a measuring apparatus 1 is an apparatus with four axes for measuring the pulley that is a principal component of the continuously variable transmission used for automotive vehicles or industrial equipment. The measuring apparatus 1 comprises a measuring table 2 on which a workpiece is setted and measured. The measuring apparatus 1 also comprises a control board 6 as a processing section for controlling the measuring table 2 and for performing (collecting) collection and computation of data. The measuring table 2 is provided with a workpiece holding post 3 and a measuring post 5. The workpiece holding post 3 holds the workpiece and rotates the same direction about the axis. The measuring post 5 slidably stuck up (mounted) on a slide table 4. The control board 6 is provided with a computer (processor) 7 for a measurement control and a data processing. A driving control portion 8 controls an operation of the workpiece holding post 3 and the measuring post 5.

The workpiece holding post 3 comprises an upper center 3a and a lower center 3b for clamping the workpiece, and the workpiece is rotated about a main axis defined by the upper center 3a and the lower center 3b. As shown in FIG. 2, the slide table 4 slides in the direction toward and away from the workpiece (in the direction of the radial axis), and the measuring post 5 is stuck up (mounted) to slide on the slide table 4 in the direction orthogonal to the radial axis (tangent axis) that is the axis of the movement of the slide table 4.

The measuring post 5 comprises a detecting head 9 having a probe 9a with a ball of a specified diameter such as a ruby ball or the like continuing from the tip thereof so as to slide along the axial axis orthogonal to the surface defined by the radial axis and the tangent axis. The detecting head 9 can measure displacement in the directions of two axis; X and Y, where the tangent axis is an X-axis and the radial axis is a Y-axis.

The workpiece to be measured in this embodiment is a variable width pulley for the continuously variable transmission of the automotive vehicle. The pulley with variable width comprises a shaft pulley 10 provided as a fixed pulley and a sheave pulley 11 provided as a movable pulley. The shaft pulley 10 has a fixed shaft 10a formed with ball grooves 10c for the ball spline on the periphery at intervals of 120° and a conical surface 10b provided at the end of the fixed shaft 10a as shown in FIGS. 3A and 3B. The sheave pulley 11 comprises a bearing portion 11a formed with ball grooves 11c for ball spline at intervals of 120° on its inner periphery, and a conical surface 11b provided at the end of the bearing portion 11a as shown in FIGS. 4A and 4B. The balls for the bearing are interposed between the ball grooves 10c and 11c. The fixed shaft 10a of the shaft pulley 10 is fitted into the bearing portion 11a of the sheave pulley 11 so as not to rotate with respect to each other. Accordingly, the sheave pulley 11 slides in the axial direction to vary the width of the pulley.

The ball grooves 10c, 11c have the shape of a Gothic arch formed by superimposing two circles of arbitrary diameters. In this embodiment, balls having an outer diameter of 6 mm are used for bearing to be used in the ball grooves 10c, 11c in the shape of the Gothic arch. Therefore, the probe 9a used here has a precision ball having an outer diameter of 2 mm set at the tip thereof unless otherwise specified, and it is replaced by the probe having the ball having the outer diameter of 6 mm at the tip thereof according to the item to measure as appropriate.

The measurement of the pulley by the use of the measuring apparatus 1 is carried out according to the flow chart of the basic measurement process shown in FIG. 5. The configuration and the positional accuracy of the respective ball grooves 10c, 11c, and the respective conical surfaces 10b, 11b are measured with the outer diameter of the fixed shaft 10a of the shaft pulley 10 or the inner diameter of the bearing portion 11a of the sheave pulley 11 as a reference.

In this basic measurement process, in Step S1, a master test is conducted to verify the origin. As shown in FIGS. 6A and 6B, the origin is verified by setting a master core bar 20 finished in a prescribed diameter with high accuracy to the workpiece holding post 3, bringing the ball at the tip of the probe 9a into contact with the outer periphery of the master core bar 20, and recording the position.

Then, in Step S2, the shaft pulley 10 or the sheave pulley 11 is selected as the workpiece to be measured, and the selected workpiece is set and such measuring items such as the ball groove or the conical surface is selected. Then, the measurement is started in Step S3. When the measurement is terminated, deviations are calculated in Step S4, and plotting the data is carried out in Step S5 and then the process is finished.

When the shaft pulley 10 is selected as the workpiece to be measured, the fixed shaft 10a of the shaft pulley 10 is set in the direction of the main axis (axis of rotation). Then prior to the practical measurement, the center of the workpiece, which is the center of the measurement reference, is determined. Therefore, as shown in FIG. 7, the copying measurement is carried out with the tip of the probe 9a brought into contact with the outer periphery of the fixed shaft 10a for sampling the data every 0.5° of rotation of the main axis.

Data e for every point is, as shown in FIG. 7, displacement (Adx, Ady) of X-axis (tangent axis) and Y-axis (radial axis) detected by the probe 9a, and a mechanical absolute value of the angle of the rotation θ of the main axis (axis of rotation) are represented as e (X+Adx, Y+Ady, θ), which can be converted into the absolute space coordinate by the following equation (1). Conversions into the space coordinate is executed for data e on all the measuring points, and an optimum circle is obtained by a circular-approximation by a least square method. Then the center position is derived from the obtained circle as a reference of the measurement.

$$\begin{bmatrix} \cos\theta & -\sin\theta \\ \sin\theta & \cos\theta \end{bmatrix} \begin{bmatrix} X + Adx \\ Y + Ady \end{bmatrix} = e \begin{bmatrix} X \\ Y \end{bmatrix} \quad (1)$$

The following items may be selected for the shaft pulley 10 or the sheave pulley 11 as practical measurement items in this embodiment.

(1) Measurement of Ball Groove (See FIGS. 8A, 8B, 9A and 9B)

(a) Diameter of Ball Groove

The diameter is obtained by the circular-approximation of the measured data (left and right groove diameter RLH, RRH)

(b) Angle of Intersection (Rolling Angle)

The angle is defined as follows.

When the ideal circle of a specified diameter is brought into contact with the ball groove obtained in (a) at two contact points, a line can be defined by connecting one of the two contact points and the center of the ideal circle. The angle is defined by intersecting the line and the line that is formed by connecting the center of the ideal circle and the center of the workpiece. Such angles can be shown at left and right sides of the latter line (left and right rolling angle θLH, θRH).

Note that the "Ideal circle" is directed to the circle that is formed by idealizing the bearing ball of a prescribed diameter (the diameter of the reference ball of 6 mm in this embodiment)

(c) Divided Angle

The divided angle is defined by intersecting the lines that are defined by connecting the center of the workpiece and each of the centers of three ideal circles, when each of the three ideal circles is brought into contact with the respective ball groove having a diameter obtained in (a) at two points.

(d) Over-Ball Diameter, Between Diameter

The over-ball diameter is a diameter of the circle in which the three ideal circles being in contact with each ball groove of the shaft pulley 10 obtained in (a) are inscribed.

The diameter therebetween is a diameter of the circle to which the three ideal circles being in contact with each ball groove of the sheave pulley 11 obtained in (b) are circumscribed.

(e) Deviations of Lead

The deviations of the lead are directed to the circumferential and radial deviations of the lead.

(f) Run-Out, Concentricity

They are directed to a shift between the center of the circle of the outer diameter and the center of the workpiece, and a shift between the center of the circle of the diameter therebetween and the center of the workpiece.

(2) Measurement of the Conical Surface (See FIG. 10)

(a) Tapered Angle of the Conical Surface (b) Straightness of the Conical Surface The straightness of the conical surface is directed to a deviation in the direction of a normal line with respect to the specified angle line.

(c) Deviation of the Conical Surface

The deviation of the conical surface is the deviation with respect to the center of the workpiece or the deviation with respect to the reference diameter (reference outer diameter of the shaft pulley 10, reference inner diameter of the sheave pulley 11).

The measuring process for each measuring item will now be described. In the following description, the shaft pulley 10 is mainly described as the workpiece to be measured. However, the process is the same in principle for the sheave pulley 11.

(A) Measurement of the Diameter of the Ball Groove

In the process of obtaining the center of the workpiece described above, the copying measurement is carried out including the ball groove simultaneously. Therefore, when the ball groove is measured, a rough-position of the ball groove is determined in advance from the data obtained in the process of obtaining the center of the workpiece. Then each shaft is so moved that the probe 9a is positioned at the center of the ball groove to abut the tip of the probe 9a against the deepest point of the ball groove, and the position of the ball groove is verified to confirm the position of the ball groove to determine the coordinate region to be measured.

Then, the reference line of the movement for the measurement (which is hereinafter referred as a measurement movement reference line) along which the tip portion of the probe 9a should move with respect to the ball groove is so determined that the measured data remains within the measuring region of the detecting head 9. In other words, as shown in FIG. 11, the data are sampled at several points at the left and right LH, RH grooves respectively (for example, four points each of L1–L4 in LH groove, and R1–R4 in RH groove). The measuring reference circle is determined from the sampling data, and the determined measuring reference circle is decided as the measurement movement reference line along which the tip of the probe 9a moves.

The Y-axis (radial axis) and the X-axis (tangent axis) are controlled simultaneously via the slide table 4 and the measuring post 5, and then the copying measurement is carried out by moving the probe 9a along the measurement movement reference line. Then, detailed data on many points are sampled for each side of the ball grooves within the region of the inspection. The number of the data samplings is, for example, 200 point/4 mm, which is ten times the number of samplings for existing general use three-dimensional measuring apparatus, whereby the measurement with very high accuracy can be made. In this case, the ball on the tip of the probe 9a is always kept in contact in the direction of the normal line of the measurement movement reference line.

Then, the sampled data are converted into a space coordinate, and the process of the circular-approximation using the least square method are repeated several times, and then the process of averaging the several points of medium values to converge are carried out to determine the groove diameter. At the same time, the output of the detecting head 9 is supplied as the deviation of the groove diameter to evaluate circularity (roundness). The measurement is performed for the left and the right of the ball groove, and the diameters of the left and the right ball grooves RLH, RRH are measured for the three grooves automatically. As regards the direction of the lead, the measurement for several cross-sections (for example, 10 cross-sections) is possible.

(B) Measurement of the Rolling Angle

Following the determination of the diameters of the left and the right ball grooves RLH, RRH in the steps above is to obtain a rolling angle. In a first place, the center of the ideal circle of a prescribed diameter being in contact with the left and the right LH, RH groves is obtained. Since the central coordinate A1 (a1, b1) and the radius r1 of the LH circle forming the LH groove and the central coordinate A2 (a2, b2) and the radius r2 of RH circle forming the RH groove are known from the already obtained data, the LH circle and RH circle can be expressed in the following equations (2), (3). Since the radius of the ideal circle r3 is known, where the central coordinate of the ideal circle is A3 (a3, b3), it can be expressed by the equation (4).

$$(X-a1)^2+(X-b1)^2=r1^2 \quad (2)$$

$$(X-a2)^2+(X-b2)^2=r2^2 \quad (3)$$

$$(X-a3)^2+(X-b3)^2=r3^2 \quad (4)$$

Here, the distance between the centers of the LH circle, the RH circle, and the ideal circle are obtained respectively. The distance A1A2 between the center A1 of the LH circle and the center A2 of the RH circle can be expressed by the equation (5) shown below. Since the center line between the contact point of the ideal circle and the center A3 of the ideal circle passes through the center A1 of the LH circle or the center A2 of the RH circle by all means (See FIG. 12), the distance A1A3 between the center A1 of the LH circle and the center A3 of the ideal circle, and the distance A2A3 between the center A2 of the RH circle and the center position A3 of the ideal circle can be expressed by the equations (6), (7) respectively.

$$A1A2=((a1-a2)^2+(b1-b2)^2)^{0.5} \quad (5)$$

$$A1A3=r1-r3 \quad (6)$$

$$A2A3=r2-r3 \quad (7)$$

As shown in FIG. 13, when the central coordinate A3 (a1, b1) of the ideal circle is determined, where an inclination of a line segment A1A2 is designated as α, two coordinates shown in the equations (8), (9) are obtained.

$$(a1,b1)=(a2+R\times\cos\alpha+T\times\sin\alpha,\ a2+R\times\sin\alpha-T\times\cos\alpha) \quad (8)$$

$$(a1,b1)=(a2+R\times\cos\alpha-T\times\sin\alpha,\ a2+R\times\sin\alpha+T\times\cos\alpha) \quad (9)$$

where;

$$R=(A1A2^2-A2A3^2-A1A3^2)/2/A1A2$$

$$T=(A2A3^2-R^2)^{0.5}$$

The center A3 of the ideal circle from between two coordinates of the equation (8), (9) therebetween is the center of which the value of Y-coordinate is closer to the origin. Therefore, by selecting the center that has the value of the Y-coordinate closer to the origin from between these two points and substituting it (closer one) to the equation (4), the equation (4) is given, and thus the central coordinate A3 (a1, b1) of the ideal circle can be obtained.

Then, the rolling angle on the LH groove side θLH= <B1A3O shown in FIG. 12 is obtained. In θ1, the point B1 (ab1, bb1) where two circles (LH circle, ideal circle) are in contact can be obtained as a solution of the simultaneous equation of the equation (1) and the equation (3), and as shown in FIG. 14, three sides defines the given triangle. Therefore, by applying the cosine theorem to the triangle B12A3O, the rolling angle θLH can be obtained as expressed in the equation (10) as shown below.

$$\theta LH=\arccos((b^2+c^2-a^2)/(2\times b\times c)) \quad (10)$$

where; a, b, c are the length of the respective sides of the triangle B1A3O, and the values are as follows;

$$a=(ab1^2+bb1^2)^{0.5}$$

$$b=(a3^2+b3^2)^{0.5}$$

$$c=r3$$

In this case, since the circle is obtained by approximation method in practice, there may be a case where the simultaneous equation of the equation (1) and the equation (3) has no multiple root. Therefore, considering that the ideal circle and the LH circle both having known central coordinates and the radii come into contact with each other (to have a multiple root), the rolling angle θLH may be obtained by applying the cosine theorem to the triangle A3A1O in FIG. 14, the three sides of which are known in the same manner, as shown by the following equation (11). The rolling angle θRH=<B2A3O on the RH groove side may be obtained in the same manner.

$$\theta LH = \pi - \arccos((b^2 + c'^2 b'^2)/(2 \times b \times c')) \quad (11)$$

where; b', c' are the lengths of two sides interposing the side b of the triangle A3A1O, and the values are as follows;

$$b' = (a1^2 + b1^2)^{0.5}$$

$$c' = r1 r3$$

In the case of the sheave pulley 11, it can be obtained in the same manner using the equation (11') shown below.

$$\theta LH = \arccos((b^2 + c'^2 - b'^2)/(2 \times b \times c')) \quad (11')$$

By measuring the rolling angle, a shift between the center of the processing (the center of clamping of the workpiece) and the center of a grinder can be figured out for the grinder for processing pulleys, and thus the adverse effect on a force applied to the pulley due to shift the rolling angle may be eliminated previously.

(C) Measurement of the Divided Angle

As a next step, the measurement of the divided angle will be described. The divided angle may be calculated by a computation by using the data obtained by measuring the ball groove. However, in this embodiment, the probe 9a is replaced by the probe having a ball of 6 mm in diameter at the tip to measure directly.

In other words, after the probe 9a is replaced by the probe having a precision ball of 6 mm in diameter, which corresponds to the ideal circle, mounted at the tip thereof and normalized, the probe 9a is inserted into the specified position, and brought into contact with the ball groove to measure the amount of displacement, as shown in FIG. 15. The action is performed again with the main shaft rotated by 120° to measure the ball grooves at the three positions in total. Then the amount of the displacement measured for the three ball grooves is controlled to convert the coordinate, and the divided angle is determined. In this case, by comparing and investigating the determined divided angle with the calculated value by using the data obtained by the measurement of the ball grooves, abrasion (wear) of the probe 9a can be checked.

(D) Measurement of the Outer Diameter (between Diameter)

When the three points coordinates of the center position of the balls of 6 mm at the tip of the probe 9a obtained from the data converted in the measurement of the divided angle described above is designated as O1(x1, y1), O2(x2, y2), ), O3(x3, y3), and the circle is expressed by a general expression of (12), the circle passing through the three points may be determined by solving the following equation (13) (determinant).

$$X^2 + Y^2 + fX + gY + h = 0$$

$$\begin{vmatrix} X^2 + Y^2 & X & Y & 1 \\ x1^2 + y1^2 & x1 & y1 & 1 \\ x2^2 + y2^2 & x2 & y2 & 1 \\ x3^2 + y3^2 & x3 & y3 & 1 \end{vmatrix} = 0 \quad (13)$$

In other words, when the equation (13) is solved to obtain the value corresponding to the coefficients f, g, h and substituted in the equation (12), the circle passing through the three points can be expressed by the following equation (14). Therefore, the outer diameter OP1 can be obtained by adding the reference ball diameter 6 mm to the radius of the circle obtained from the equation (14) (equation(15)), and in the same manner, the diameter OP2 therebetween can be obtained by subtracting the reference ball diameter 6 mm from the radius of the circle obtained from the equation (14) (equation (16)).

$$(X+f/2)^2 + (Y+g/2)^2 + h - (f/2)^2 - (g/2)^2 = 0 \quad (14)$$

$$OP1 = 2 \times ((f/2)^2 + (g/2)^2 - h)^{0.5} + 6 \quad (15)$$

$$OP2 = 2 \times ((f/2)^2 + (g/2)^2 - h)^{0.5} - 6 \quad (16)$$

(E) Measurement of Run-out (Oscillations)

The measurement of run-out is carried out simultaneously with the measurement of the outer diameter (between diameter). Here, where the coordinate positions of the center of the ball of 6 mm at the tip of the probe 9a are On(xn, yn), and the center of the workpiece is (xo, yo), as shown in FIG. 16, the length Sn (n=1, 2, 3) from the center of the workpiece to the center position of the tip ball of the probe 9a is shown by the following equation (17). By substituting the coordinate value into the equation, the difference between the maximum value and the minimum value at this time is run-out (the oscillation).

$$Sn = ((xn-xo)^2 + (yn-yo)^2)^{0.5} \quad (17)$$

(F) Measurement of Concentricity

When the central position of the circle obtained by the measurement of the outer diameter (between diameter) is placed at P (xp, yp), the concentricity D can be obtained as the value by doubling the shift between the center position P (xp, yp) and the center of the workpiece (xo, yo), as shown in the equation (18).

$$D = ((xp-xo)^2 + (yp-yo)^2)^{0.5} \times 2 \quad (18)$$

(G) Measurement of the Lead

In the same manner as the measurement of the divided angle, the probe 9a having a tip ball of 6 mm in diameter is used, and, as shown in FIG. 17, the tip ball of the probe 9a abuts the groove and moved along the axis of the workpiece to measure. As shown in FIG. 18, respectively, a circumferential displacement dx and a radial displacement dy are taken simultaneously as a circumferential deviation of the lead and a radial deviation of the lead, and the deviation of the lead is measured at ten cross-sectional points.

In this lead measurement, by checking a slant of each shaft of the groove processing machine for the two axis at the same time, the lead can be figured out more precisely, and the adverse effect on the force applied to the pulley due to the deteriorated accuracy of the lead may be prevented in advance.

(H) Measurement of the Conical Surface

In the measurement of the conical surface, the conical surface of the workpiece is faced upwardly, and the biaxial head that can measure displacement in the biaxial direction; X-axis (tangent axis) and Y-axis (radial axis) of the detecting head 9 is replaced by the uniaxial head to measure displacement in the direction of axial direction (Z axis). When the biaxial head is used, the detecting head 9 is rotated by 90° together with the probe 9a and set to measure displacement in the direction of Z-axis.

Then, as shown in FIG. 19(A), the measuring post 5 is moved in the direction of X axis (tangent axis) with the tip ball of the probe 9a kept in contact with the conical surface 10b of the shaft pulley 10 or the conical surface lib of the sheave pulley 11, and, as shown in FIG. 19(B), the apex of the conical surface is picked up, where the center position of the workpiece is placed. Then the axial (Z-axis) and the radial axis (Y-axis) are controlled simultaneously in a state where the probe 9a is placed to the center of the workpiece to measure the specified region.

In this case, as regards the tapered angle of the conical surface, since the measured configuration includes swells (waveness) or roughness as shown in FIG. 20, the tangent of the swell in the prescribed evaluation range is supplied as a measured value of the tapered angle. However, the angle processed from the measured data by the the least square method is also supplied. At the same time, as shown in FIG. 21, the deviation in the direction of the normal line with respect to the reference line (prescribed angle line) is measured as straightness.

The measurement described-above is carried out for the several points on the conical surface by rotating the main shaft. In addition, the prove 9a is moved in the direction of Y-axis (radial axis) to the specified position, and the main shaft is rotated to take the data, and then the difference between the maximum and the minimum values is supplied as the deviation of the conical surface.

By measuring the conical surface, the amount of deformation of the member due to heat treatment can be figured out with high accuracy in a short time, and thus an operator can perform a check in the grinding process in a short time.

As described above, in the present invention, the configuration and the positional accuracy of the continuously variable transmission pulley can be measured quantitatively, thereby contributing to improvement of the quality of the finished products and lowering the costs.

While there have been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A measuring apparatus for a pulley having a ball groove for a ball spline and a conical surface for varying a pulley width of the pulley, comprising:

a workpiece holding post for rotatably holding the pulley about an axis of the pulley;

a slide table slidable in a radial direction of the measuring apparatus;

a measuring post slidably mounted on said table in a tangent direction orthogonal to the radial direction of the measuring apparatus;

a detecting head slidably mounted on the measuring post in an axial direction orthogonal to both of the radial and tangent directions of the measuring apparatus, said detecting head having a probe including a ball of a specified diameter formed at the tip thereof; and a processor for controlling movements of said slide table, said measuring post and said detecting head, to allow said probe to be brought into contact with a portion of the pulley to be measured, and for measuring the configurations and the positional accuracy thereof based on displacement data detected by the detecting head, and wherein said processor measures an angle of intersection defined by intersecting a line connecting the center of an ideal circle and one of the two contact points and a line connecting the center of the ideal circle and the center of a measuring reference of the pulley when an ideal circle of a specified diameter is brought into contact with the ball groove at two contact points.

2. The measuring apparatus according to claim 1, wherein the processor processes displacement data obtained by a copying measurement at many points, obtains a position of the center of the ideal circle assuming that the center of the circle obtained by approximating the ball groove, the contacting point, and the center of the ideal circle are on the same line, and obtains the angle of the intersection based on the position of the center of the ideal circle.

3. A measuring apparatus for a pulley having a ball groove for a ball spline and a conical surface for varying a pulley width of the pulley, comprising:

a workpiece holding post for rotatably holding the pulley about an axis of the pulley;

a slide table slidable in a radial direction of the measuring apparatus;

a measuring post slidably mounted on said table in a tangent direction orthogonal to the radial direction of the measuring apparatus;

a detecting head slidably mounted on the measuring post in an axial direction orthogonal to both of the radial and tangent directions of the measuring apparatus, said detecting head having a probe including a ball of a specified diameter formed at the tip thereof; and a processor for controlling the movements of said slide table, said measuring post and said detecting head, to allow said probe to be brought into contact with a portion of the pulley to be measured, and for measuring configurations and the positional accuracy thereof based on displacement data detected by the detecting head, and wherein said processor measures a divided angle defined by intersecting lines connecting the center of a measuring reference of the pulley and each of the centers of a plurality of ideal circles, wherein each of said ideal circles has a specified diameter and is brought into contact with the respective ball groove at two contact points.

4. The measuring apparatus according to claim 3, wherein the processor measures the divided angle based on the respective center positions of the ball at the moment when the probe with a ball diameter corresponding to one of said ideal circles is brought into contact with a plurality of ball grooves.

5. A measuring apparatus for a pulley having a ball groove for a ball spline and a conical surface for varying a pulley width of the pulley, comprising:

a workpiece holding post for rotatably holding the pulley about an axis of the pulley;

a slide table slidable in a radial direction of the measuring apparatus;

a measuring post slidably mounted on said table in a tangent direction orthogonal to the radial direction of the measuring apparatus;

a detecting head slidably mounted on the measuring post in an axial direction orthogonal to both of the radial and tangent directions of the measuring apparatus, said detecting head having a probe including a ball of a specified diameter formed at the tip thereof; and a processor for controlling movements of said slide table, said measuring post and said detecting head to allow said probe to be brought into contact with a portion of the pulley to be measured, and for measuring configurations and positional accuracy thereof based on displacement data detected by the detecting head, and wherein said processor measures at least one of (a)–(k):
  (a) a groove diameter of the ball groove;
  (b) an angle of intersection defined by intersecting a line connecting the center of an ideal circle and one of the two contact points and a line connecting the center of the ideal circle and the center of a measuring reference of the pulley when an ideal circle of a specified diameter is brought into contact with the ball groove at two contact points,
  (c) a divided angle defined by intersecting lines connecting the center of a measuring reference of the pulley and each of the centers of a plurality of ideal circle, wherein each of said ideal circles has a specified diameter and is brought into contact with the respective ball groove at two contact points,
  (d) a diameter of an outer circle of an ideal circle, wherein said ideal circle has a specified diameter and is brought into contact with the respective ball groove at two contact points,
  (e) a deviation between the center of a measuring reference of the pulley and the center of an outer circle to which a plurality of ideal circles are inscribed, wherein each of said ideal circles has a specified diameter and is brought into contact with the respective ball groove at two contact points,
  (f) a diameter of an inner circle to which a plurality of ideal circles are circumscribed, wherein each of said ideal circles has a specified diameter and is brought into contact with the respective ball groove at two contact points,
  (g) a deviation between the center of a measuring reference of the pulley and the center of an inner circle to which a plurality of said ideal circles are circumscribed, wherein each of said ideal circle has a specified diameter and is brought into contact with the respective ball groove at two contact points,
  (h) circumferential and radial deviations in a lead of the ball groove,
  (i) a tapered angle of the conical surface;
  (j) a deviation in a normal direction with respect to a specified angle line of the conical surface, and
  (k) a dimensional deviation with respect to a measuring reference of the conical surface; and
  wherein the processor controls said slide table and said measuring post simultaneously to move said probe in the radial and tangential directions while in the state of being in contact with the ball groove to carry out a copying measurement at many points, carries out circular-approximation by processing data on displacement in the radial direction and data on displacement in the tangential direction detected by the detecting head during the copying measurement at many points, and obtains an approximated diameter of the circle obtained by the circular-approximation as the groove diameter of the ball groove.

6. The measuring apparatus according to claim 5, wherein the processor determines a measuring reference circle to which the tip of the probe should move based on several sampling data obtained prior to the copying measurement at many points, and controls said slide table and said measuring post simultaneously.

7. A measuring apparatus for a pulley having a ball groove for a ball spline and a conical surface for varying a pulley width of the pulley, comprising:

a workpiece holding post for rotatably holding the pulley about an axis of the pulley;

a slide table slidable in a radial direction of the measuring apparatus;

a measuring post slidably mounted on said table in a tangent direction orthogonal to the radial direction of the measuring apparatus;

a detecting head slidably mounted on the measuring post in an axial direction orthogonal to both of the radial and tangent directions of the measuring apparatus, said detecting head having a probe including a ball of a specified diameter formed at the tip thereof; and a processor for controlling movements of said slide table, said measuring post and said detecting head to allow said probe to be brought into contact with a portion of the pulley to be measured, and for measuring configurations and positional accuracy thereof based on displacement data detected by the detecting head, and wherein said processor measures at least one of (a)–(k):
  (a) a groove diameter of the ball groove;
  (b) an angle of intersection defined by intersecting a line connecting the center of an ideal circle and one of the two contact points and a line connecting the center of the ideal circle and the center of a measuring reference of the pulley when an ideal circle of a specified diameter is brought into contact with the ball groove at two contact points,
  (c) a divided angle defined by intersecting lines connecting the center of a measuring reference of the pulley and each of the centers of a plurality of ideal circles, wherein each of said ideal circles has a specified diameter and is brought into contact with the respective ball groove at two contact points,
  (d) a diameter of an outer circle of an ideal circle, wherein said ideal circle has a specified diameter and is brought into contact with the respective ball groove at two contact points,
  (e) a deviation between the center of a measuring reference of the pulley and the center of an outer circle to which a plurality of ideal circles are inscribed, wherein each of said ideal circles has a specified diameter and is brought into contact with the respective ball groove at two contact points,
  (f) a diameter of an inner circle to which a plurality of ideal circles are circumscribed, wherein each of said ideal circles has a specified diameter and is brought into contact with the respective ball groove at two contact points,
  (g) a deviation between the center of a measuring reference of the pulley and the center of an inner circle to which a plurality of said ideal circles are circumscribed, wherein each of said ideal circles has a specified diameter and is brought into contact with the respective ball groove at two contact points,
  (h) circumferential and radial deviations in a lead of the ball groove,
  (i) a tapered angle of the conical surface;
  (j) a deviation in a normal direction with respect to a specified angle line of the conical surface, and (k) a dimensional deviation with respect to a measuring reference of the conical surface; and wherein the processor determines a measuring reference circle to which the tip of the probe should move based on several sampling data obtained prior to a copying measurement at many points, and controls said slide table and said measuring post simultaneously so that the tip of the probe moves along the measuring reference circle.

8. A measuring apparatus for a pulley having ball grooves for a ball spline and a conical surface for varying a pulley width of the pulley, comprising:

a workpiece holding post for rotatably holding the pulley about an axis of the pulley;

a slide table slidable in a radial direction of the measuring apparatus;

a measuring post slidably mounted on said table in a tangent direction orthogonal to the radial direction of the measuring apparatus;

a detecting head slidably mounted on the measuring post in an axial direction orthogonal to both of the radial and tangent directions of the measuring apparatus, said detecting head having a probe including a ball of a specified diameter formed at the tip thereof; and a processor for controlling movements of said slide table, said measuring post and said detecting head to allow said probe to be brought into contact with a portion of the pulley to be measured, and for measuring configurations and positional accuracy thereof based on displacement data detected by the detecting head, and wherein said processor obtains the diameter of a circle passing through respective center positions of the ball when the probe with a ball diameter is brought into contact with the plurality of ball grooves, and adds or subtracts a ball diameter of the probe to or from the obtained diameter of the circle to determine the diameter of an outer circle in which a plurality of ideal circles are inscribed or the diameter of an inner circle to which a plurality of ideal circles are circumscribed, and wherein the ideal circles are of a specified diameter corresponding to the ball diameter and are brought into contact with respective ball grooves at two contact points.

9. A measuring apparatus for a pulley having a ball groove for a ball spline and a conical surface for varying a pulley width of the pulley, comprising:

a workpiece holding post for rotatably holding the pulley about an axis of the pulley;

a slide table slidable in a radial direction of the measuring apparatus;

a measuring post slidably mounted on said table in a tangent direction orthogonal to the radial direction of the measuring apparatus;

a detecting head slidably mounted on the measuring post in an axial direction orthogonal to both of the radial and tangent directions of the measuring apparatus, said detecting head having a probe including a ball of a specified diameter formed at the tip thereof and a processor for controlling movements of said slide table, said measuring post and said detecting head to allow said probe to be brought into contact with a portion of the pulley to be measured, and for measuring configurations and positional accuracy thereof based on displacement data detected by the detecting head, and wherein said processor measures a tapered angle of the conical surface; and wherein the processor determines a line containing the apex of the conical surface obtained by controlling the measuring post to move in the tangent direction with the probe kept in contact with the conical surface of the pulley as a measuring reference centerline, carries out a copying measurement at many points by controlling the slide table and the measuring post simultaneously while moving the probe along the measuring reference centerline, and obtains the tapered angle of the conical surface based on data on displacement in the radial direction and data on displacement in the axial direction detected by the detecting head during the copying measurement at many points.

* * * * *